(12) United States Patent
Lee

(10) Patent No.: US 12,268,309 B1
(45) Date of Patent: *Apr. 8, 2025

(54) CHAIR HAVING AN ARM WITH AN ADAPTIVE ASSEMBLY FOR USE WITH A PHONE

(71) Applicant: JBL INTERNATIONAL, INC, Houston, TX (US)

(72) Inventor: Lawrence K. Lee, Houston, TX (US)

(*) Notice: Subject to any disclaimer, the term of this patent is extended or adjusted under 35 U.S.C. 154(b) by 172 days.

This patent is subject to a terminal disclaimer.

(21) Appl. No.: 18/186,615

(22) Filed: Mar. 20, 2023

Related U.S. Application Data

(63) Continuation-in-part of application No. 17/812,247, filed on Jul. 13, 2022, now Pat. No. 11,612,250.

(51) Int. Cl.
*A47C 7/62* (2006.01)
*H04M 1/04* (2006.01)

(52) U.S. Cl.
CPC .............. *A47C 7/624* (2018.08); *H04M 1/04* (2013.01)

(58) Field of Classification Search
CPC .......... A47C 7/624; A47C 7/622; H04M 1/04; B60N 2/793; B60N 3/103
See application file for complete search history.

(56) References Cited

U.S. PATENT DOCUMENTS

| | | | |
|---|---|---|---|
| 8,522,917 B1 | 9/2013 | Oh et al. | |
| D696,657 S | 12/2013 | Cohen | |
| 10,231,550 B2 | 3/2019 | Weirun | |
| 10,405,659 B2 | 9/2019 | Garison | |
| D894,655 S | 9/2020 | Cook | |
| D935,255 S | 11/2021 | Snir | |
| 11,612,250 B1* | 3/2023 | Lee | A47C 7/72 297/188.18 |
| 2010/0244507 A1 | 9/2010 | Miyazaki et al. | |
| 2015/0208810 A1 | 7/2015 | Kim | |

* cited by examiner

*Primary Examiner* — Mark R Wendell
(74) *Attorney, Agent, or Firm* — Egbert, McDaniel & Swartz, PLLC

(57) ABSTRACT

An assembly has a chair with at least one arm. The arm has a cavity formed therein. An insert member is removably received in the cavity. The insert member has a surface and an outer periphery. The insert member is rotatable within the cavity. The insert member has at least one projection extending upwardly from the surface of the insert member. This projection is adapted to support a phone thereagainst. The insert member is movable between a first position in which the projection is exposed outwardly of the chair, a second position in which the projection is stowed in the cavity and a third position in which the insert member is positioned beneath the cavity.

19 Claims, 4 Drawing Sheets

CHAIR HAVING AN ARM WITH AN ADAPTIVE ASSEMBLY FOR USE WITH A PHONE

CROSS-REFERENCE TO RELATED APPLICATIONS

The present application is a continuation-in-part of U.S. patent application Ser. No. 17/812,247, filed on Jul. 13, 2022, presently pending.

BACKGROUND OF THE INVENTION

1. Field of the Invention

The present invention relates to armrests for chairs. More particularly, the present invention the relates to phone supports. Furthermore, the present invention relates to phone supports that are integrated into the armrest of a chair.

2. Description of Related Art Including Information Disclosed Under 37 CFR 1.97 and 37 CFR 1.98

Cupholders are convenient to hold insecure beverage containers. Cupholders are sometimes built into the arms of outdoor or folding chairs. Some cupholders are simply attachable to a folding chair either by attachment to the frame of the chair or to the arm of the chair. Cupholders may be used to hold a variety of other objects for a user of the chair. These other objects can include a beverage, a cup, a phone, change, a wallet, keys, etc. Some holders may be round to fit a beverage or cup. Some holders can be shaped to fit other items, such as a phone.

Some cupholders or storage modules for chairs are flexible in that they are made of netting, beverage cooler foam, or any other material sufficiently flexible to be folded. Such a storage module is adapted to fit in and hang from a chair arm. These flexible cupholders and storage modules fail to provide a strong support for the item being stored.

Many users of these chairs desire to watch videos or television programs on their phones. As such, it would be desirable to have an attachment for a chair that allows the phone to be positioned so as to be watchable by the user of the chair. Under certain circumstances, glare from the sun can interfere with the ability to properly watch a show on the phone. As such, a need has developed so as to be able to properly adapt the orientation of the phone so as to avoid problems associated with reflection. In certain circumstances, users may wish to watch the program in a landscape format or in a portrait format. As such, there is a need to provide an attachment for a chair in which is adaptable to both the landscape format and the portrait format of the phone.

Many cupholder attachments for chairs are molded into the chair. As such, when the cupholders not in use, there is a cavity that can accumulate dirt and debris therein. This can create an unpleasant appearance for the chair. As such, need has developed so as to assure that the cavity is closed when the cavity is not in use.

In the past, various patents have issued with respect to cupholders for chairs. For example, U.S. Pat. No. 10,231,550, issued on Mar. 19, 2019 to Z. Weirun, describes a collapsible chair or cell phone holder for a chair arm. The collapsible holder is set in a chair arm. The holder holds a cup or a cell phone. The holder has a movable member and a stationary member. The movable member has a bottom plate and a pair of upstanding legs. The legs have tabs. The stationary member has an upper lip, side walls and retainers for the legs. The legs slidably move in the stationary member such that, in a collapsed mode, the bottom plate is closest to the lip and the holder is encased in the chair arm plane. In the expanded mode, when the tab acts as the stop against the retainer and the bottom plate is further farthest away from the top surface of the chair arm and the lip, the holder is able to hold a cup or a cell phone.

U.S. Pat. No. 10,405,659, issued on Sep. 10, 2019 to Garison et al., teaches a folding chair armrest with an acoustic enhancing cell phone holder. This armrest assembly is for use with a folding chair. The armrest assembly has a molded plastic body with a top surface and an underside. The armrest assembly is provided with a phone holder that amplifies sounds produced by the cell phone. An access opening is formed in the top surface of the armrest. A receptacle holds the cell phone and is positioned under the access opening. The receptacle has a base that is smaller than the access opening. Side walls extend from the access opening to the base, thereby creating a tapered construct capable of amplifying sounds generated within the receptacle by the cell phone. Protrusions are formed on the base of the receptacle. The protrusions support the cell phone in the receptacle and prevent the speakers of the cell phone from becoming muffled by directly contacting the base within the receptacle.

U.S. Patent Application Publication No. 2015/0208810, published on Jul. 30, 2015 to K. K. Kim, shows a foldable chair having a portable telephone holder. The portable telephone holder has a holder body having side walls on four side surfaces thereof and is longitudinally perforated to hold a portable telephone. Front and rear panels are installed in the front and rear surfaces of the holder body, respectively. A maximum height of the front panel is lower than a maximum height of the rear panel and is higher than a height of an upper end of the holder body. Position limiting panels are installed to the left and right sides of the holder body, respectively, to limit a position of a portable telephone. The phone is transversely placed at the upper end of the holder body.

U.S. Design Pat. No. D696,657, issued on Dec. 30, 2013 to W. Cohen, shows a phone holder insert for a folding chair armrest having a body with a plurality of slots formed therein and an opening at the top of the body through which the phone can be exposed.

U.S. Design Pat. No. D894,655, issued on Sep. 1, 2020 to Cook et al., teaches an armrest having a cupholder at one end thereof. The cupholder has a pair of slots that are diametrically opposed to one another around the circular diameter of the cupholder. The slots are adapted to receive the bottom of a cell phone therein.

U.S. Design Pat. No. D935,255, issued on the Nov. 9, 2021 to Snir et al., shows a chair arm having a cell phone pocket. An indentation is formed at the end of the arm. The bottom of the cell phone can be placed into this indentation so as to face in a direction transverse to the longitudinal axis of the arm.

It is an object of the present invention to provide a cell phone holder for a chair which is easy to turn and orient.

It is another object the present invention to provide a cell phone holder for a chair which allows the user to adjust the viewing angle.

It is another object of the present invention provide a cell phone holder for an arm of a chair which is adaptable to various sizes of phones and tablets.

It is still another object of the present invention provide a cell phone holder for an arm of the chair which allows shows on the phone to be displayed in either a landscape or a portrait format.

It is another object of the present invention to provide a cell phone holder for an arm of the chair which is movable between three positions.

It is another object of the present invention provide a cell phone holder for an arm of the chair which is easily storable.

It is a further object of the present invention to provide a cell phone holder for an arm of the chair which accommodates various sizes of beverage containers.

It is another object of the present invention provide a cell phone holder for an arm of the chair in which the cavity drains easily.

It is a further object of the present invention to provide a cell phone holder for an arm of the chair which is easily washable.

It is still a further object of the present invention to provide a cell phone holder for an arm of the chair which is easy to use, easy to manufacture and relatively inexpensive.

These and other objects and advantages of the present invention will become apparent from a reading of the attached specification and appended claims.

BRIEF SUMMARY OF THE INVENTION

The present invention is an assembly that comprises a chair having at least one arm. The arm has a cavity formed therein or affixed thereto. The cavity has a bottom and a side wall. An insert member is removably received in the cavity. The insert member can be a cup, a disc, a concave member or a convex member. The insert member has a surface. The insert member is rotatable within the cavity. The insert member has at least one projection extending upwardly from the surface of the insert member. The projection is adapted to support a phone thereagainst or thereon.

The projection of the present invention, in the preferred embodiment of the present invention, comprises a first panel extending upwardly from the surface of the insert member and a second panel extending upwardly from the surface of the insert member. The first panel is in spaced relation to the second panel. In particular, the first panel is in parallel planar relationship to the second panel. A space is formed between the first panel and the second panel. This space is adapted to receive the lower portion of the phone therein. In the preferred embodiment of the present invention, the first panel has a height that is less than a height of the second panel. The first panel and the second panel may have a plurality of ribs extending outwardly from and in transverse relation to the respective panels.

The projection has a lip extending outwardly therefrom. The lip is arranged adjacent an upper end of the projection. The cavity is a slot formed in either the side wall or the bottom. The slot is adapted to removably receive the lip of the projection.

The outer periphery of the insert member has an indented area formed therein. This indented area is adapted to receive a human finger between the side wall of the cavity and the outer periphery of the insert member.

The surface of the insert member is preferably planar. The bottom surface is generally flush with the surface of the arm of the chair when the insert member is inverted and positioned in the cavity. The surface of the insert member has a hole formed therein. The hole is adapted to allow a liquid to drain outwardly from the cavity.

The cavity has a shoulder formed therein. The shoulder extends inwardly from the side wall of the cavity. The shoulder is formed between an upper surface of the arm of the chair and the bottom of the cavity. In particular, in the preferred embodiment the present invention, the shoulder comprises a first shoulder and a second shoulder that are in co-planar relationship to each other. The first shoulder extends around a portion of an inner diameter of the cavity. The second shoulder extends around another portion of the inner diameter of the cavity. An end of the first shoulder is spaced from an end of the second shoulder. The space between the ends of the shoulders is adapted to receive a lower portion of a larger size phone therein. The surface of the insert member resides upon the shoulder of the cavity.

The present invention is also an assembly having a chair with at least one arm, and a cavity formed in the at least one arm. The cavity has a bottom, a side wall having a cylindrical shape, a first shoulder extending inwardly from the side wall and extending around a portion of an inner diameter of the cavity, a second shoulder extending inwardly from the side wall, the second shoulder positioned opposite the first shoulder, and a slot extending from one side of the side wall to an opposite side of the side wall. The slot is defined by spaces between opposite ends of the first shoulder and the second shoulder.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
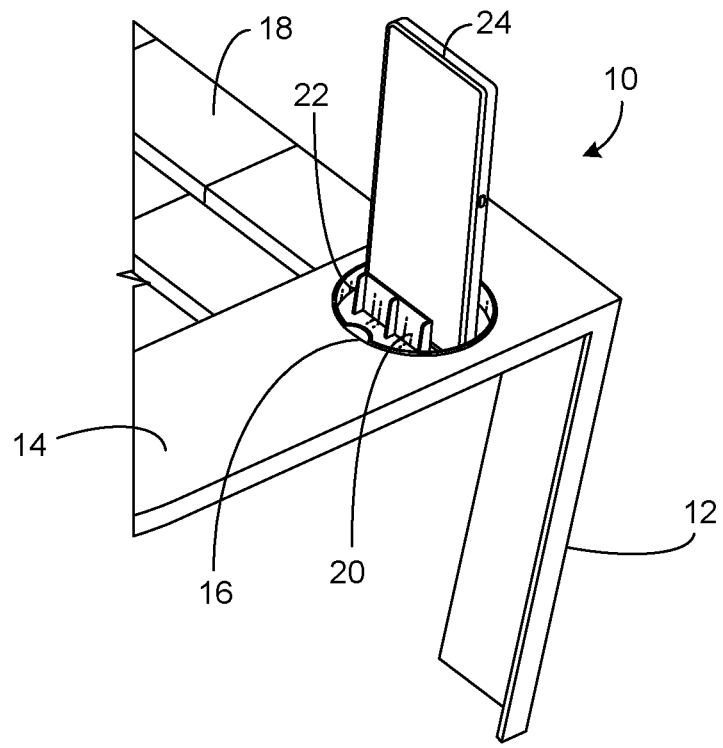
FIG. 1 is an upper perspective view showing the cell phone holder in accordance with the teachings of the preferred embodiment the present invention.

Referring to FIG. 1, there is shown the assembly 10 of the present invention. The assembly 10 includes a chair 12 having an arm 14. A cavity 16 is formed in a forward portion of the arm 14. In the preferred embodiment of the present invention, the chair 12 is an Adirondack-style chair. However, a wide variety of other types of chairs could be utilized with the concept of the present invention. A seat 18 is positioned inwardly of the arm 14 of chair 12. The chair 12 can have another arm opposite to arm 14. Another cavity, such as cavity 16, can be formed on the other arm. Such a construction would be identical to that shown herein.

In FIG. 1, it can be seen that there is an insert member 20 positioned within the cavity 16. Insert member 20 is in the form of a cup in the preferred embodiment of the present invention. However, the insert member can be a disc, a concave member or a convex member. The insert member is fitted within cavity 16 so as to be rotatable therein. There is at least one projection 22 extending upwardly from the surface of the insert member 20. Projection 22 is configured so as to support a phone 24 thereon or thereagainst.

Figure 8:
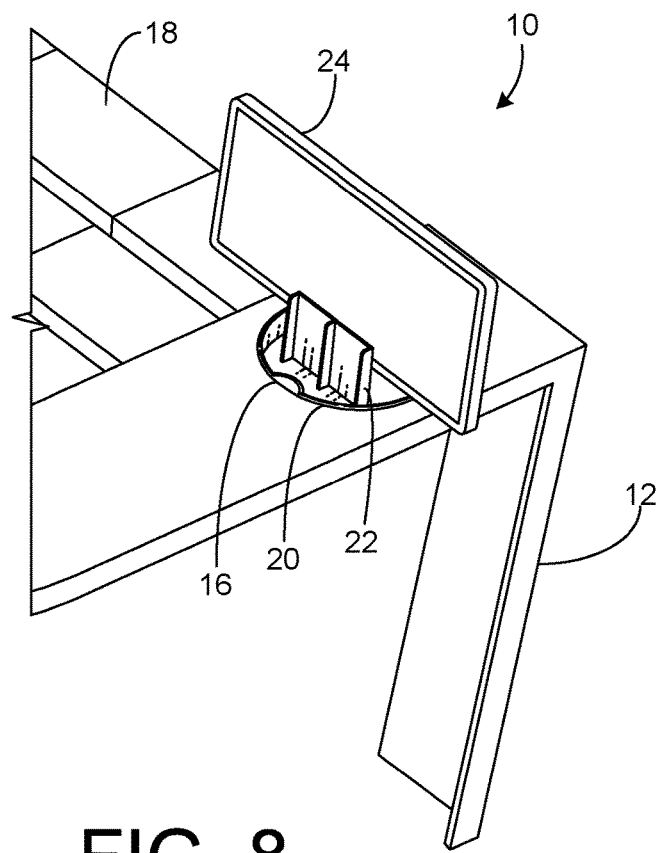
FIG. 8 is an upper perspective view showing the cell phone holder, wherein a cell phone is held in a landscape orientation.

As can be seen in FIG. 1, the phone 24 is positioned facing a person seated on the seat 18 of the chair 12. Under certain circumstances, glare from the sun, or other light source, will make it difficult to view the screen of the cell phone 24. As such, the insert member 20 can be suitably rotated within the cavity 16 so as to minimize this glare. In other circumstances, when it is desired to watch a program in a landscape mode, as opposed to a portrait mode, the phone 24 can be rotated 90° and placed against the projection 22 (as shown in FIG. 8). Once again, the screen can be adjusted by rotating the insert member 20 within the cavity 16. The angle of the phone 24 can also be adjusted by changing the angle of placement of the phone 24 against the projection 20.

Figure 2:
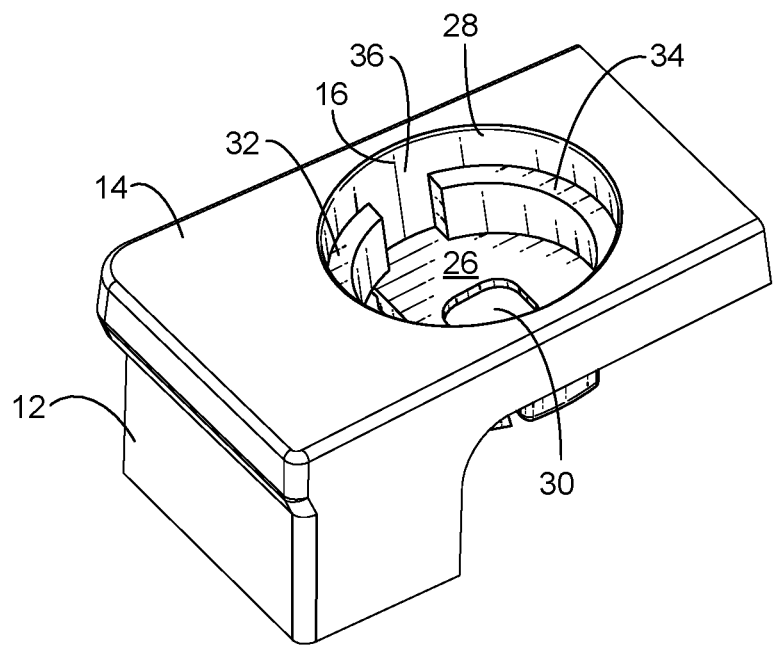
FIG. 2 is an upper perspective view showing the cell phone holder-receiving cavity formed in the arm of a chair.

FIG. 2 shows the construction of the cavity 16 within the arm 14 of chair 12. The cavity 16 has a bottom 26 and a side wall 28. The side wall 28 is of generally a cylindrical construction. The cavity 16 opens to the top surface of the arm 14 of chair 12. A hole 30 is formed at the bottom 26 of cavity 16. Hole 30 is adapted to allow liquids to be drained from the interior of the cavity 16. As such, if it is necessary to clean the interior of the cavity 16, water can be introduced so as to remove debris and other particles from the interior of the cavity 16. This water will then drain through the hole 30. This will maintain the cleanliness of the cavity 16.

Cavity 16 has a first shoulder 32 and a second shoulder 34 formed therein. The shoulders 32 and 34 extend inwardly from the side wall 28 of the cavity 16. The shoulders 32 and 34 are formed between the upper surface of the arm 14 of the chair 12 and the bottom 26 of cavity 16. The first shoulder 32 is in coplanar relationship with the second shoulder 34. The first shoulder 32 extends around a portion of an inner diameter of the cavity 16. The second shoulder 34 also extends around another portion of the internal diameter of the cavity 16. The end of the first shoulder 32 defines a space 36 from an end of the second shoulder 34. It should be noted that there is another space (such a space 36) formed between the opposite ends of the shoulders 32 and 34. Space 36 extends from the shoulders 32 and 34 down to the bottom 26 of cavity 16.

In the present invention, the space 36 (or spaces 36) define a slot or slots that can be further used so as to receive larger cell phones therein. If the cell phone it is particularly wide, the insert member can be dispensed with and the cell phone introduced into the slots 36. The inward extension of the shoulders 32 and 34 is further configured so as to allow for the proper placement of smaller diameter insert members and larger diameter insert members. Larger diameter drink containers can be placed on the shoulders 32 and 34, while narrow diameter drink containers can be placed upon the inner surfaces defined by shoulders 32 and 34. As such, the smaller diameter drink container can be placed against the bottom 26 of the cavity 16 and supported by the inner walls of the shoulders 32 and 34. In normal use, the insert member 20 will be positioned on the shoulders 32 and 34. As such, the rotation of the insert member 20 will be with respect to the side wall 28 of the cavity 16 positioned above each of the shoulders 32 and 34.

Figure 3:
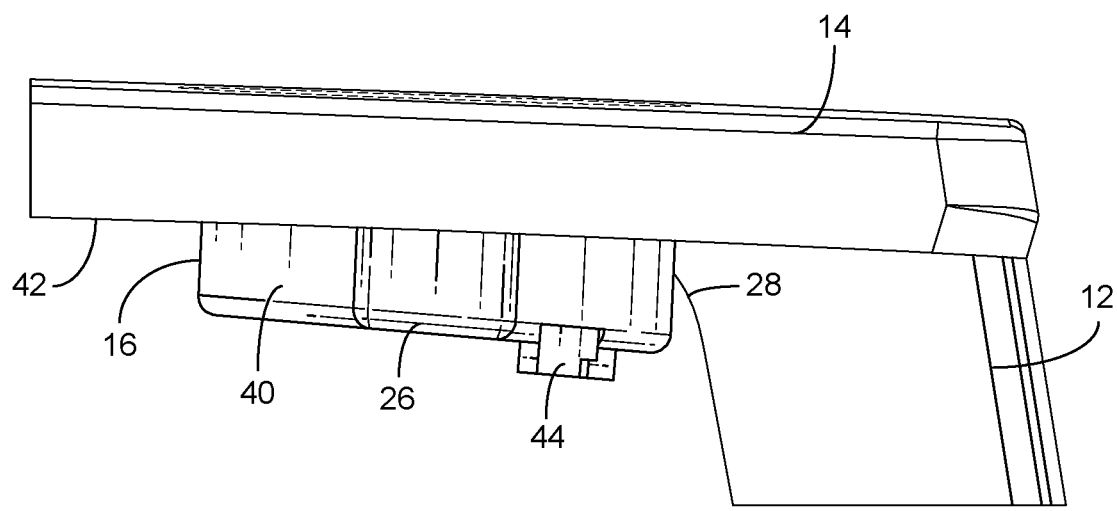
FIG. 3 is a side elevational view of the cell phone holder-receiving cavity and the arm of the chair.

FIG. 3 shows a side view of the arm 14 of chair 12. In FIG. 3, it can be seen that the cavity 16 is formed so as to have a portion 40 extending below the bottom 42 of arm 14. There is a slot 44 that is formed through either the bottom 26 of the cavity 16 or through the side wall 28 of the cavity 16. The slot 44 is adapted to receive a lip extending from the projection of the cell phone-receiving insert member 20 (to be described hereinafter).

Figure 4:
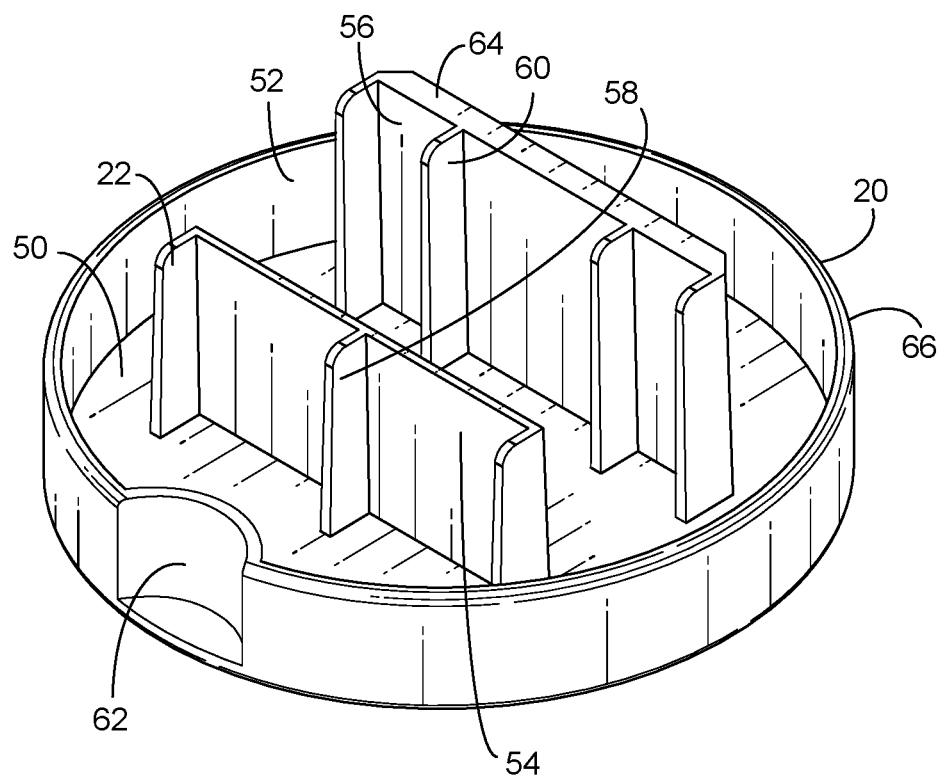
FIG. 4 is an upper perspective view of the cell phone holder insert member of the present invention.

FIG. 4 shows the configuration of the cell phone-receiving insert member 20. Insert member 20 is removably received within the cavity 16. The insert member 20 has a bottom surface 50 and an outer wall 52. The insert member 20 is rotatable within the cavity 16. The insert member 20 has at least one projection 22 extending upwardly from the bottom surface 50 of the insert member 20. The projection 22 is adapted to support a phone thereagainst. This projection 22, in the preferred embodiment the present invention, comprises a first panel 54 and a second panel 56. The first panel 54 extends upwardly from the bottom surface 50 of the insert member 20. The second panel 56 also extends upwardly from the bottom surface 50 of the insert member 20. The first panel 54 is in spaced relation to the second panel 56. In particular, the first panel 54 is in parallel planar relationship to the second panel 56. There is a space defined between the first panel 54 and the second panel 56 that is adapted to receive the lower portion of the phone therein. The first panel 54 has a height that is less than a height of the second panel 56. It can be seen that there are a plurality of ribs 58 that are formed or affixed to the first panel 54 and a plurality of ribs 60 that are affixed to or formed with the second panel 56. Ribs 58 and 60 are configured so as to provide structural integrity to each of the respective panels 54 and 56. Ribs 58 and 60 extend transverse to the plane of the first panel 54 and the second panel 56. Ribs 58 and 60 will extend from the top of each of these panels down to the bottom surface 50 of the insert member 20.

The outer wall 52 of the insert member 20 may have an indented area 62 formed therein. This indented area 62 is adapted to receive a human finger between the side wall 28 of the cavity 16 and the outer periphery 52 of the insert member.

The projection 56 has a lip 64 extending outwardly therefrom. This lip 64 is arranged adjacent to the upper end of the panel 56. As was described in association with FIG. 3, there is a slot 44 formed on one of the side wall 28 or bottom 26 of the cavity 16. The slot 44 is adapted to receive the lip 64 of the panel 56.

In FIG. 4, it can be seen that the first panel 54 has a height that is less than the height of the second panel 56. This configuration assures that the cell phone can lean against the second panel 56. The lower height of the first panel 54 avoids obscuring the screen of the phone while, at the same time, assuring the stability of the phone resting thereagainst. The space between the panels 54 and 56 ensures that every size of cell phone can be placed therebetween. As such, the phone can be placed into the space in either a portrait mode or a landscape mode. In a landscape mode, outer portions of the phone may rest against the upper edge 66 of the insert member 20. The insert member 20 can be easily rotated by placing a finger into the indented area 62 and thereby spinning the insert member 20 within the cavity 16. Alternatively, when a phone is placed into the space between the first panel 54 and the second panel 56, the phone can be twisted so as to achieve a proper viewing angle.

Figure 5:
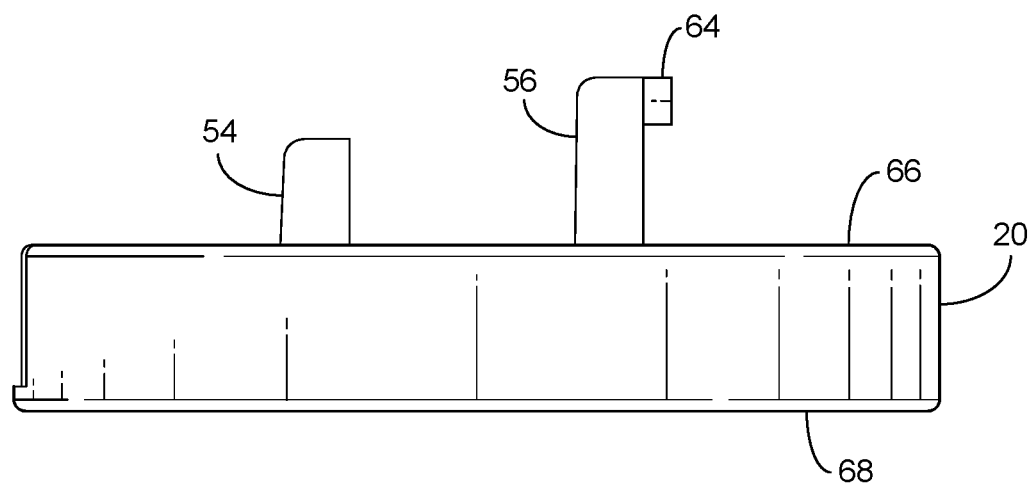
FIG. 5 is a side elevational view of the cell phone holder insert member of the present invention.

FIG. 5 shows a side view of the insert member 20. As can be seen, the insert member (in this embodiment) is of a cup form. However, various other forms could be used within the scope of the present invention. In particular, insert member 20 has a planar bottom surface 68. This planar bottom surface will rest upon the shoulders 32 and 34 of the cavity 16 (as shown in FIG. 2). FIG. 5 shows that there is the first panel 54 and the second panel 56 extending upwardly and outwardly above the top edge 66 of the insert member 20. Panel 56 has lip 64 extending outwardly in transverse relationship therewith.

Figure 6:
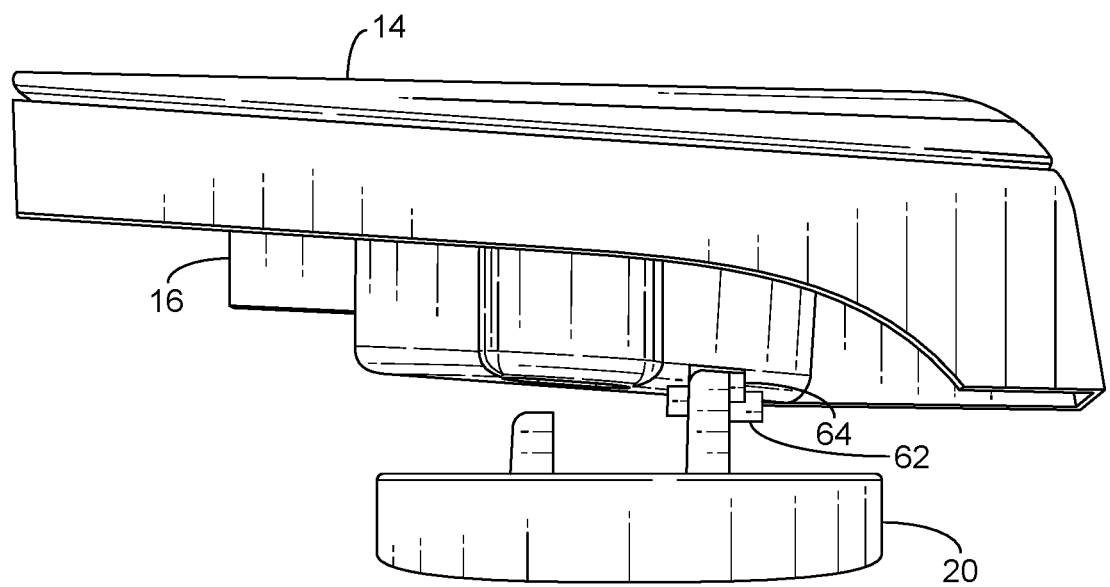
FIG. 6 is a side elevational view of the cell phone holder insert member as positioned below the arm of the chair.

FIG. 6 shows how the insert member 20 is received within the cavity 16 for the support of a phone 24. In certain circumstances, one may not wish to view the phone or have the insert member 20 in its phone-supporting position. A user may desire to use the cavity simply for holding a beverage or beverage container. As such, FIG. 6 shows how the insert member 20 is removed from its position within the cavity 16. The insert member is then brought to the bottom of the cavity 16 such that the lip 64 is inserted into slot 62. The insert member 20 can then slide across a diameter or a chord of the cavity 16 within the slot 62 so as to be supported and positioned below the arm 14 of the chair. This allows the insert member 20 to be easily stowed when not in use. In order to deploy the insert member 20, it is only necessary to slide the lip 64 outwardly from the slot 62 and then place the body of the insert member 20 into the cavity 16 at the top of the arm 14 (in the manner described herein previously).

Figure 7:
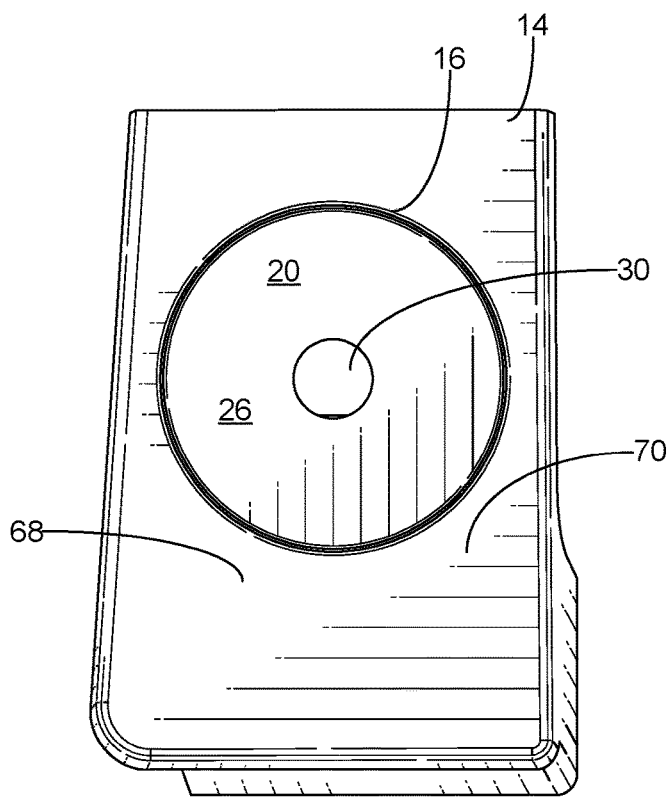
FIG. 7 is an upper perspective view showing the cell phone holder insert member as inverted so as to form a flat planar surface with the arm of the chair.

In certain other circumstances, the user may desire to use the arm of the chair simply as a chair arm. The user may not wish to have the cavity 16 exposed. This would occur where the chair is being stored or being used in a manner to which debris could accumulate within the cavity. Under these circumstances, as shown in FIG. 7, the insert member 20 is inverted within the cavity 16. The planar bottom surface 68 of the insert member 20 will be generally coplanar with or flush with the surface 70 of arm 14. Hole 30 will still open through the bottom 26 of the insert member 20. The hole 30 can be used so as to allow a user lift the insert member 20 from this stowed position, to invert the insert member 20, and then expose the cell phone-receiving projections on the other side of the insert member 20.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An assembly comprising:
    a chair having at least one arm, the at least one arm having a cavity formed therein or affixed thereto, the cavity having a bottom, a shoulder and a side wall; and
    an insert member removably received in the cavity, said insert member having a surface, said insert member being rotatable within said cavity, said insert member having at least one projection extending upwardly from the surface of said insert member, the at least one projection adapted to support a phone thereagainst, wherein the surface of said insert member resides upon the shoulder of the cavity.

2. The assembly of claim 1, wherein said insert member is a cup.

3. The assembly of claim 1, wherein the at least one projection comprises:
    a first panel extending upwardly from the surface of said insert member; and
    a second panel extending upwardly from the surface of said insert member, said first panel being in spaced relation to said second panel.

4. The assembly of claim 3, said first panel being in parallel planar relationship to said second panel, a space between said first panel and said second panel adapted to receive a lower portion of the phone therein.

5. The assembly of claim 4, said first panel having a height less than the height of said second panel.

6. The assembly of claim 5, each of said first panel and said second panel having a plurality of ribs extending outwardly therefrom any transverse relationship therewith.

7. The assembly of claim 1, wherein the at least one projection has a lip extending outwardly therefrom, the lip being arranged adjacent at upper end of the at least one projection, the cavity having a slot formed in one of the side wall and the bottom, the slot adapted to removably receive the lip of the at least one projection.

8. The assembly of claim 1, wherein said insert member has an indented area formed in a periphery thereof, the indented area adapted to receive a human finger between the side wall of the cavity and the periphery of the insert member.

9. The assembly of claim 1, wherein a bottom surface of said insert member is planar, the bottom surface being generally flush with a surface of the at least one arm of the chair when said insert member is inverted and positioned in the cavity.

10. The assembly of claim 1, wherein the surface of said insert member has a hole formed therethrough, the hole being adapted to allow a liquid to drain therethrough.

11. The assembly of claim 1, wherein the shoulder comprises a first shoulder and a second shoulder in coplanar relationship to each other, the first shoulder extending around a portion of an inner diameter of the cavity, the second shoulder extending around another portion of the inner diameter of the cavity, an end of the first shoulder being spaced from an end of the second shoulder.

12. An assembly comprising:
    a chair having at least one arm, the at least one arm having a cavity formed therein or affixed thereto, the cavity having a bottom and a side wall; and
    an insert member removably received in the cavity, said insert member having a surface and an outer periphery, said insert member having at least one projection extending upwardly from the surface of said insert member, the at least one projection adapted to support a phone thereon or thereagainst, the at least one projection comprising:
        a first panel extending upwardly from the surface of said insert member; and
        a second panel extending upwardly from the surface of said insert member, said first panel being in spaced relation to said second panel, a space between said first panel and said second panel adapted to receive a lower portion of the phone therein, said first panel having a height less than a height of said second panel, wherein said insert member is rotatable within the cavity.

13. The assembly of claim 12, wherein the cavity has a shoulder formed therein, the shoulder extending inwardly from the side wall of said of the cavity, the shoulder being formed between an upper side of the at least one arm of said chair and the bottom of the cavity, the surface of said insert member residing upon the shoulder of the cavity.

14. The assembly of claim 12, wherein said first panel is in parallel planar relationship to said second panel.

15. An assembly comprising:
    a chair arm having a cavity formed therein or affixed thereto, the cavity having a bottom at a side wall; and
    an insert member removably received in the cavity, said insert member having a surface and an outer periphery, said insert member having at least one projection extending upwardly from the surface of said insert member, said insert member being positionable in a first position in which the at least one projection is exposed outwardly of said chair arm and a second position in which the at least one projection is stowed in the cavity and the surface of said insert member is generally planar with a top surface of said chair arm.

16. The assembly of claim 15, the at least one projection having a lip extending outwardly therefrom, the lip being arranged adjacent an upper end of the at least one projection, the cavity having a slot formed on one of the side wall and the bottom, the slot adapted to removably received the lip of the at least one projection, said insert member having a third position in which said insert member is below the bottom of the cavity when the lip is received in the slot.

17. The assembly of claim 15, the at least one projection comprising:
    a first panel extending upwardly from the bottom surface of said insert member; and
    a second panel extending upwardly from the surface of said insert member, said first panel being in spaced relation to said second panel, said first panel being in parallel planar relationship to said second panel, a space between said first panel and said second panel adapted to receive a lower portion of the phone therein.

18. The assembly of claim 15, wherein the cavity has a shoulder formed therein, the shoulder extending in inwardly extending inwardly from the side wall of the cavity, the shoulder formed between upper surface of the at least one arm and the bottom of the cavity, the shoulder comprising a first shoulder and a second shoulder arranged in coplanar relationship to each other, the first shoulder extending around a portion of an inner diameter of the cavity, the second shoulder extending around another portion of the inner diameter of the cavity, an end of the first shoulder being spaced from an end of the second shoulder, the surface of the insert member residing upon the shoulder of the cavity when the insert member is in the first position.

19. An assembly comprising:
    a chair having at least one arm; and
    a cavity formed in the at least one arm, the cavity comprising:
    a bottom;
    a side wall having a cylindrical shape;
    a first shoulder extending inwardly from the side wall and extending around a portion of an inner diameter of the cavity;
    a second shoulder extending inwardly from the side wall, the second shoulder positioned opposite the first shoulder; and
    a slot extending from one side of the side wall to an opposite side of the side wall, said slot being defined by spaces between opposite ends of the first shoulder and the second shoulder.

\* \* \* \* \*